United States Patent [19]

Badalich et al.

[11] 3,782,811
[45] Jan. 1, 1974

[54] FILMSTRIP PROJECTOR WITH SYNCHRONIZED SOUND
[75] Inventors: Frank C. Badalich, Chicago; Roy H. Watterlohn, Morton Grove, both of Ill.
[73] Assignee: Bell & Howell Company, Chicago, Ill.
[22] Filed: Jan. 13, 1972
[21] Appl. No.: 221,464

Related U.S. Application Data
[62] Division of Ser. No. 97,859, Dec. 14, 1970, Pat. No. 3,675,994.

[52] U.S. Cl. .................... 352/17, 352/22, 352/175
[51] Int. Cl. ............................................ G03b 31/04
[58] Field of Search .................. 352/15, 16, 17, 22, 352/31, 175; 353/15

[56] References Cited
UNITED STATES PATENTS
3,620,609   11/1971   John .................................... 352/17
3,567,316   3/1971   Witharm ......................... 352/175 X
3,266,862   8/1966   Wagoner ........................... 352/15 X
3,674,348   7/1972   Figge et al. ...................... 352/17 X
3,457,005   7/1969   Goodman ........................... 352/17

Primary Examiner—Samuel S. Matthews
Assistant Examiner—Michael L. Gellner
Attorney—William K. Serp

[57] ABSTRACT

A control apparatus for a film strip projector provided with synchronized audio accompaniment. A recorder having a control track provides actuation signals for control of the projector motor. In response to a control signal from the recorder control track the projector motor is actuated and maintained energized through an operational movement corresponding to the advance of one film frame after which it is deactivated in ancipication of a subsequent control signal.

7 Claims, 9 Drawing Figures

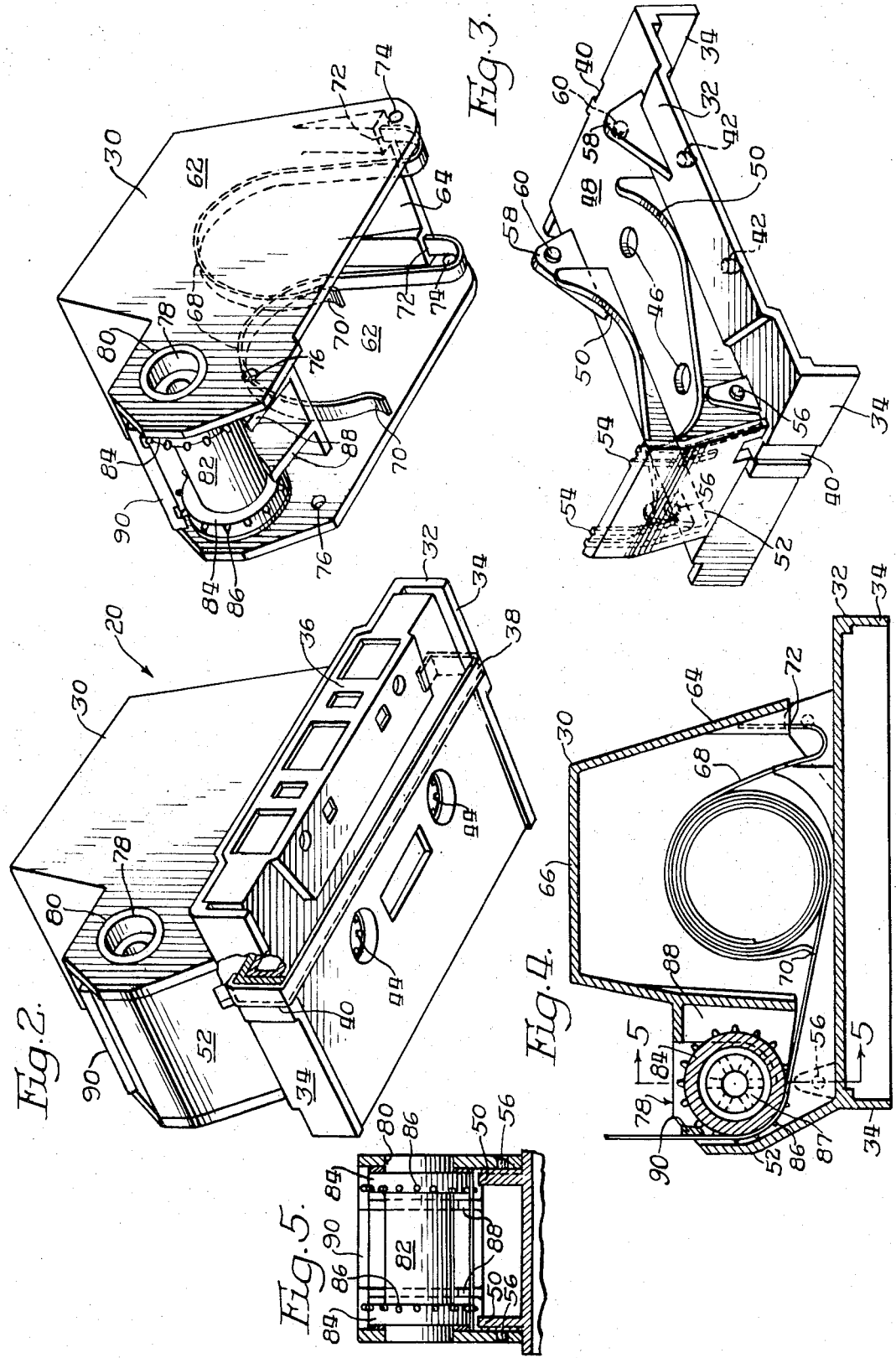

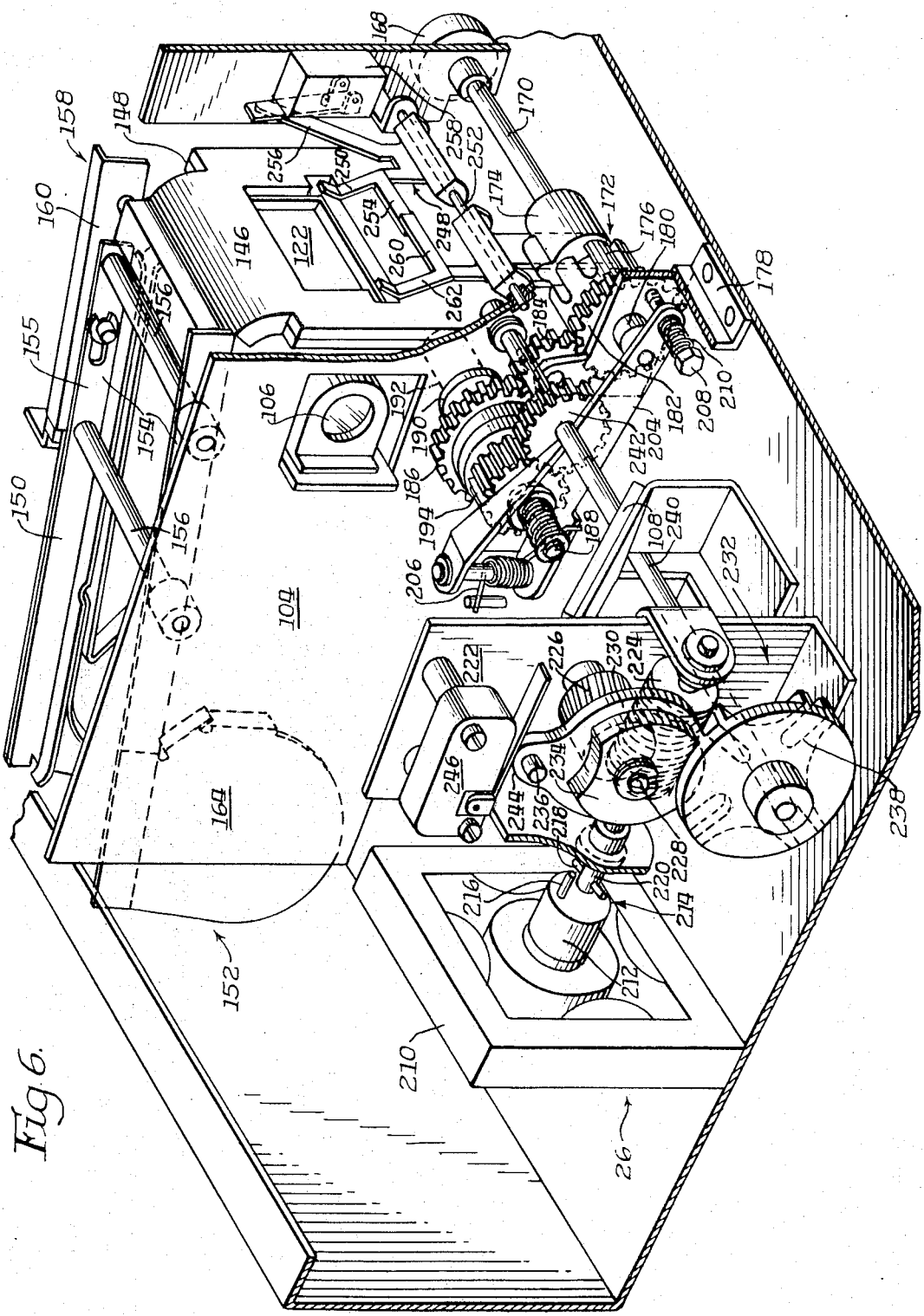

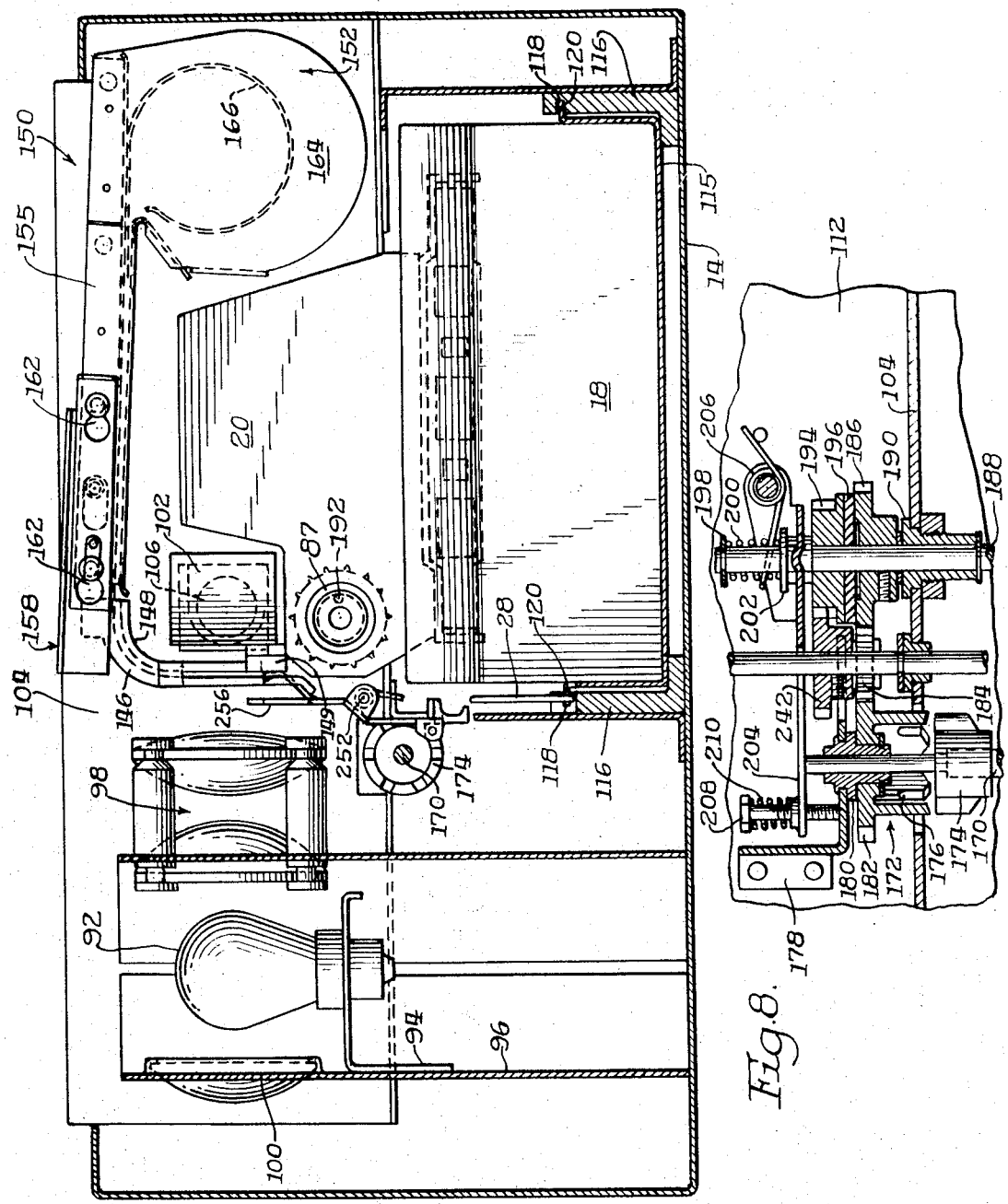

FILMSTRIP PROJECTOR WITH SYNCHRONIZED SOUND

This is a division of application Ser. No. 97,859, filed Dec. 14, 1970.

FILMSTRIP PROJECTOR WITH SYNCHRONIZED SOUND

This invention generally relates to a filmstrip projector and more particularly to a filmstrip projector adapted for use with a recorder providing synchronized audio accompaniment.

BACKGROUND OF THE INVENTION

Filmstrip projectors are finding wide acceptance in the instructional as well as sales promotional fields. This media is especially suitable for such purposes in that it permits the presentation of selected illustrations for varying time periods depending upon their informational content thus conserving film. It will be appreciated that the simultaneous performance of a synchronized audio presentation greatly increases the interest and usefulness of the visual presentation.

The illustrated embodiment is particularly suited for the projection of 35mm film but lends itself to other sizes as well. A particular characteristic of 35mm filmstrip is that development standards are not well formulated throughout the industry. In this regard the sprocket holes are not precisely located with respect to the individual frames preventing the indexing of the film frames with the projection aperture by means of the sprocket hole orientation. Further, since the film sprocket holes are not precisely related to the position of the film frames, the advancing mechanism must be relatively exact to ensure suitable framing throughout the entire film roll.

A particular feature of the illustrated embodiment is the inclusion of a tape recorder which supplies audio accompaniment as well as a control signal for automatically advancing the filmstrip from frame to frame in synchronism with the audio format. Additionally, the user is afforded the option of preparing and editing his own filmstrips. This feature is accomplished by the addition of a signaling oscillator the output of which is appropriately recorded as a frame advancing signal. The main object of this invention is to provide an improved filmstrip projector which includes means for providing synchronized audio accompaniment for the film format.

Other objects and advantages of this invention will become obvious from the following description of a preferred embodiment when considered in conjunction with the accompanying drawings.

DESCRIPTION OF THE DRAWINGS

FIG. 2 is a prospective view of cartridge featured in combination with the projector illustrated in FIG. 1;

FIG. 3 is a prospective view of the cartridge of FIG. 2 disassembled to more clearly illustrate the features of the components thereof;

FIG. 4 is a full sectional view of the cartridge of FIG. 2 with the audio cassette removed for clarity of illustration;

FIG. 5 is a sectiolnal view of the cartridge of FIG. 2 taken along the line 5—5 of FIG. 4;

FIG. 6 is a prospective view of a portion of the filmstrip projector illustrated in FIG. 1;

FIG. 7 is a sectional view of the projector taken along the line 7—7 of FIG. 1;

FIG. 8 is an enlarged sectional fragmentary view of the projector of FIG. 1 taken along the line 8—8;

BRIEF DESCRIPTION OF THE ILLUSTRATED EMBODIMENT

-GENERAL-

Figure 1:
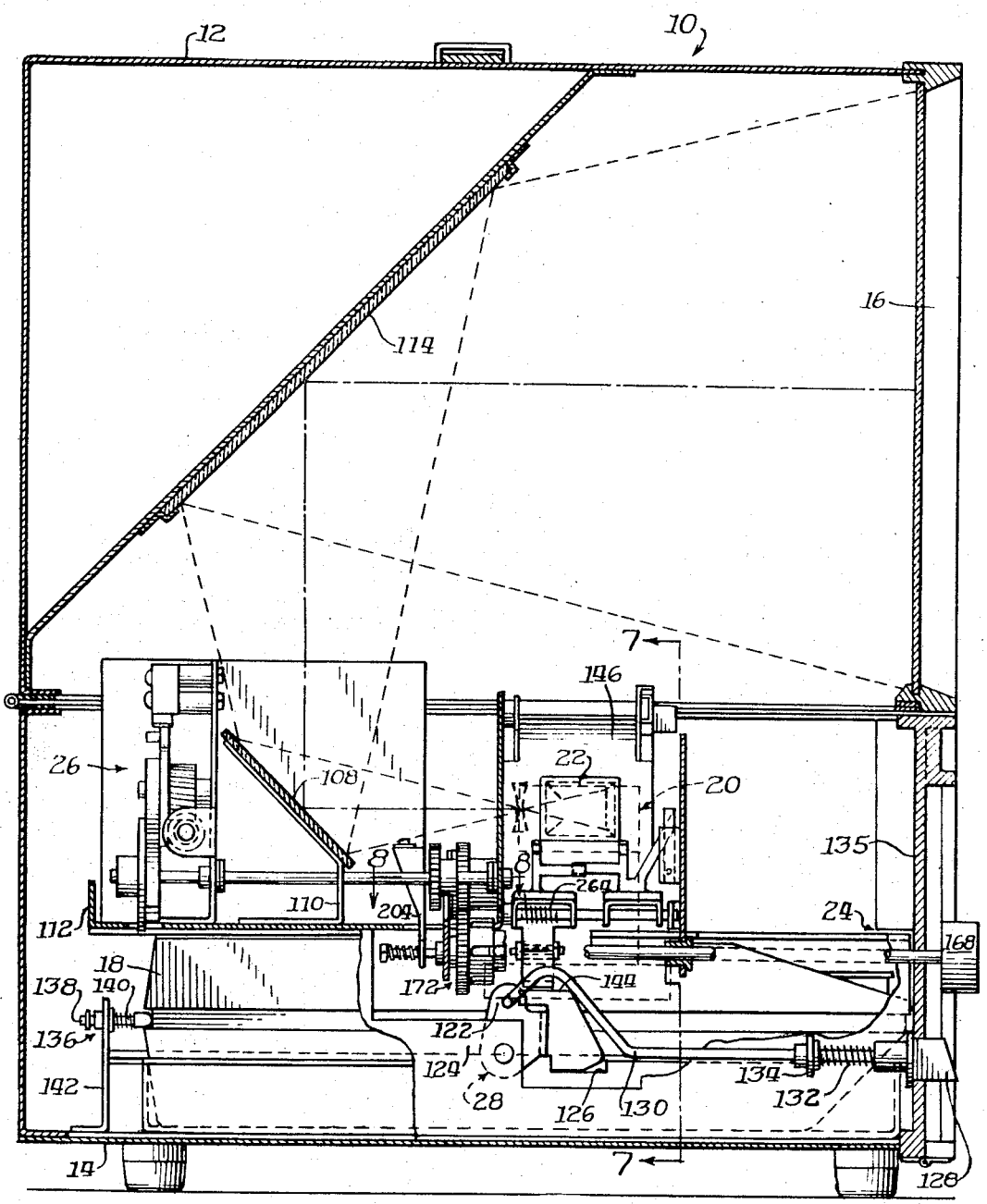
FIG. 1 is a full sectional view of a filmstrip projector including certain features of this invention.

Briefly, the rear screen filmstrip projector 10 illustrated in FIG. 1 is housed within a cabinet consisting of a cover 12 and a base 14. One wall of the cover is a rear projection screen 16 upon which the images are displayed. Housed in the base is a dual track audio cassette tape recorder 18 of modified construction carrying a cartridge 20. Upon loading of the cartridge 20 within the projector 10 the first frame of the filmstrip is manually framed with respect to a projection aperture 22 by a manually operable framing means 24. The projector 10 is energized causing the image of the frame centered in the projection aperture 22 to be projected upon the screen 16. Simultaneously therewith, the tape recorder 18 is actuated starting the audio tape cassette play. The recorder 18 provides audio accompaniment and by a first track carrying the audio message as well as film advance control by means of signals recorded upon a second track. Upon the occurrence of a control signal a frame advancing means 26 advances the filmstrip a single frame.

Serving to prevent jamming or tearing of the film, an interlock 28 prevents removal of the tape recorder while the film is threaded through the projector 10. Additionally, the projector 10 includes various other operational features which will hereinafter be more thoroughly discussed.

DETAILED DESCRIPTION OF THE ILLUSTRATED EMBODIMENT

CARTRIDGE

-BASE-

The cartridge 20 carried by the tape recorder 18 is particularly illustrated in FIGS. 2–5 and comprises a cover 30 and a base 32. The base 32 includes a pair of adjacent parallel oriented cassette retaining walls 34 which cooperate to securely receive a conventional audio tape cassette 36. To ensure that the cassette is held in position, a retaining spring 38 engages with a pair of spring guides 40 defined by the outwardly disposed surfaces of the cassette retaining walls 34. Additionally, projecting from the lower surface of the base 32 are a pair of downwardly depending alignment pins 42 which are received in holes defined by the body of the cassette. Support wall 48 of the base 32 is provided with a pair of clearance apertures 46 which allow the record drive spindles (not shown) to fully engage the drive spools 44 of the cassette.

The upper surface of the support wall 48 carries a pair of spaced film guide rails 50 the upwardly disposed edges of which are arcuately shaped. The ends of the rails are secured to a curved front wall 52. The inwardly disposed surface of the front wall 52 carries two spaced pairs of sprocket hole guides 54. Each pair is secured to the wall 52 adjacent one edge thereof and serves to assure positive drive of the film as will further be described. Secured to the outwardly disposed surfaces of the film guide rails 50 adjacent the front wall are locking bosses 56 which are selectively maintained in cooperative engagement with the cartridge cover 30. Secured to the base 32 adjacent the ends of the film guide rails opposite the locking bosses are a pair of triangular shaped hinge supports 58. Inwardly projecting from each of the hinge supports 58 are hinge pins 60 which cooperate with the cover to permit convenient access to the interior of the cartridge 20.

- COVER -

The cover 30 comprises a pair of side walls 62, a rear wall 64 and a top wall 66 which define a film cavity. Positioned within the cover 30 and serving to maintain the film in proper relationship with respect to the cartridge is a film retaining means in the form of a pair of arcuately shaped resilient springs 68. The springs are fabricated from elongated metallic strips or any other suitable material. One end of each of the metallic strips is turned in a reverse curve as at 70 which serves to prevent scratching of the film emulsion during passage of the film from the cartridge. The remaining ends of the metallic strips are bent in an abrupt reverse curve and are positioned within spring receiving slots 72 moled in the rear wall 64 of the cover. Adjacent the spring receiving slots 72 in each side wall of the cover are hinge holes 74 which mate with the hinge pins 60 on the base 32. Further, locking holes 76 are punched in the side walls 62 of the cover 32 and engage the locking bosses 56 on the cover. The hinge so formed permits the cartridge 20 to be conveniently opened and the locking means ensures against accidental opening.

Rotationally supported within the cover 30 and serving to drive the film through the cartridge is a film drive spool 78. The ends of the film drive spool 78 are journaled through apertures 80 cut in the side walls 62 of the cover 30. The film drive spool 78 includes a central hub 82 and a pair of parallel spaced flanges 84. Each of the flanges 84 carries sprocket teeth 86 spaced for engagement with the sprocket holes provided along the margins of the film. The sprocket teeth 86 are so aligned with the sprocket hole guides 54, previously described, that as the film passes through the cartridge the margin of the film rides along the sprocket hole guides 54 and ensures that the sprocket teeth 86 adequately engage the film. The central portion of the hub 82 is hollowed to define a splined receiver 87 for engagement with the frame advance means 26 as will subsequently be further described. Mounted upon the top wall 66 within the cover and adjacent the film drive spool 78 are a pair of film spool guides 88 which prevent the film from improperly threading about the drive spool 78, a situation which might occur as a natural result of the curl of the emulsion. Similarly, a guide strap 90 is secured between the side walls 62 of the cover adjacent the drive spool 78 to ensure that the film will feed vertically from the cartridge rather than follow its natural curl.

- OPERATION -

In use, the audio tape cassette 36 is positioned in the compartment defined by the base 32 of the cartridge 20 and is retained in place by the locking spring 38. The cartridge is swung open on its hinges and the film, in coiled form, forced into the film retaining springs 68. The film is played out to the film drive spool 78 where it is engaged with the sprocket teeth 86. The cover 30 is forced shut and locked by the locking bosses 56 seating in the holes 76. In the closed position, the film rests upon the guide rails 50 and engages the sprocket teeth 86 on the drive spool 78. The guide strap 90 forces the film against its natural curl, upward along a plane generally normal to the base and thus facilitates threading through the aperture plates on the base 14 of the projector cabinet.

PROJECTOR

- PROJECTION SYSTEM -

Maintained within the base of the cabinet is a projection system which comprises a bulb 92 mounted upon a bulb support channel 94, which in turn is secured to the walls 96 of an opaque light chamber. Reflecting the light toward a condensor lens assembly 98 is a reflector 100. The light passes through the film and is directed by means of a light mirror 102 mounted upon an inner wall 104 through a projection lens 106. The image is reflected by a first reflecting mirror 108 mounted upon a mirror support stand 110 secured to the surface of a chassis 112 mounted in the base. The image reflected by the first mirror 108 is passed to a second reflecting mirror 114 which is supported between adjacent cover walls subtending the included angle and therefrom directed to the projection screen 16.

-RECORDER-

As shown in FIG. 7, a pair of parallel, adjacently spaced support rails 116, which are longitudinally notched as at 118, serve to slidably receive a tape recorder drawer 115. The outer walls of the drawer 115 are flared outwardly to define flanges 120 which rest within the notches 118 in the rails 116. Within the drawer 115 is seated the audio tape cassette recorder 18. The recorder 18 is adapted to receive the cartridge 20. As previously mentioned the lower portion of the cartridge 20 carries an audio tape cassette 36, which is received by the recorder in a conventional manner. Securely retaining the recorder drawer 115 in position within the base 14 of the cabinet is an interlock 28.

As shown in FIG. 1, interlock 28 includes a locking pawl 122 pivotably supported for rotational movement with respect to an inner wall 124 of the cabinet. The pawl 122 is seated within a notch 126 defined by the wall of the recorder drawer. Manual release of the drawer is by means of a release knob 128 accessible from the front of the cabinet and connected to the locking pawl 122 by a locking rod 130. Biasing the locking pawl 122 in the locked position is a coil spring 132 resting on a support angle 134 through which the rod 130 is journaled. Thus in response to depression of the knob 128 the pawl 122 is rotated about its pivot in a counterclockwise direction as viewed in FIG. 1, releasing the drawer for removal through an access door 135. Serving to ensure secure seating of the pawl 122 with respect to the drawer 115 and thus ensure that the cartridge is properly positioned with respect to the projection aperture is a biasing means 136. The biasing means 136 urges the recorder 18 and thus the drawer in which it is seated against the holding surface of the pawl 122. The biasing means 136 includes a plunger 138 about which is positioned a coil spring 140. The plunger is journaled through a mounting angle 142 secured to the floor of the base of the cabinet. Additionally, the pawl displaces an upwardly disposed surface 144 for cooperation with an interlock mechanism as will hereinafter be further described.

After the audio tape cassette and film are fitted in place within the cartridge 20, the cartridge is loaded into the tape recorder and the recorder drawer is slid forward until the locking pawl 122 drops into the notch 126 in the side wall of the drawer. The biasing means 136 assures that the locking pawl 122 is properly seated with respect to the drawer 115 and thus maintains proper orientation of the cartridge 20 within the projector 10,

-FILM GUIDE-

As the cartridge moves into position the film is cammed between a pair of spaced parallel operative plates 146 and 148 mounted on the inner wall 104 which define the projection aperture 22. Serving to ensure threading of the film between the plates 146 and 148 is a spoon shaped cam 149 secured to the forwardly disposed edge of the plate 148. The film, due to the natural curl of the emulsion is forced against the cam surface and urged into position bptween the plates.

During projection, the film is advanced through a film chute 150 and then into a storage retainer 152 as illustrated in FIG. 7. The film chute 150 comprises a pair of slotted rails 154 which are positioned to receive the film passing between the aperture plates. The rails are mounted on the inner wall 104 by mounting posts 156 the outer ends of which are grooved. Serving to facilitate rapid removal of the film, should it become jammed during projection, is a locking means 158 which comprises a flat locking plate 160 having slotted openings 162. The outer rail 155 is positioned upon the posts 156. The plate 160 is placed over and slidably secured to the grooved end support posts 156. The film retainer 152 includes a pair of parallel disposed spaced ear shaped receivers 155 which has a single turn coil spring 166 secured to its inwardly disposed surface. The coil spring 166 ensures that the stored film will be maintained in a nest coiled condition.

- FRAMING -

As previously mentioned, a particular characteristic of a filmstrip is that the development criteria are not well established and the location of the sprocket hole perforations along the film margin has no predetermined position with respect to the frames. Prior to automatic operation, the first frame of the film is properly positioned with respect to the projection aperture 22 by the framing means 24. Serving to facilitate manual operation of the framing means 24 is a framing knob 168 locked to a framing rod 170 passing into the base of the projector. As illustrated in FIGS. 6 and 8 the rod is journaled through the inner support wall 104. Adjacent the inner end of the framing rod 170 is a selectively engageable coupling in the form of a straight tooth positive clutch 172, including a tooth driver 194, and a slotted receiver 176. The driver 174 is set to the framing rod 170 and the slotted receiver 176 is rotatably mounted to a support angle 178 by a bushing 180 through which the rod 170 is slidably journaled.

Formed upon the closed end of the receiver is a wheel gear 182 engaged with an idler gear 184 mounted on the bracket 178. The idler gear 184 in turn engages a framing gear 186 mounted upon a film drive shaft 188. The film drive shaft 188 is journaled through the inner wall 104 of the cabinet by means of a sleeve bearing 190. One end of the drive shaft 188 carries a tooth member 192 (FIG. 7) of a dog-clutch which engages the splined receiver 87 of the cartridge as film spool 78 previously described. Mounted upon the drive shaft and selectively rotatable with respect thereto is a drive gear 194. Positioned between the drive gear and the framing gear is a friction washer 196 of resilient material forming a friction clutch. Wound about the drive shaft and maintained in place with a "C" washer 198 secured to the rearward end of the drive shaft 188 is a clutch spring 200. The remaining end of the clutch spring rides upon the face of a shoulder washer 202. The shoulder of the washer 202 bears against the drive gear 194 thus assuring that during the normal position of a spring loaded clutch arm 204 the drive gear 194 drives the framing gear 186. The clutch arm 204 is pivotably supported upon the upper surface of the chassis 112. The clutch defines an opening through which the shank of the shoulder washer 202 passes. Serving to bias the free end of the clutch arm toward the drive gear 194 is a torsion spring 206.

An inward push to the framing knob pivots clutch arm 204 clockwise as viewed in FIG. 8 engaging the lips of the washer and releasing the force which maintains the gears 194 and 186 in frictional engagement. The framing gear 186 and the drive gear 194 are free to independently rotate. The position of the clutch arm is adjustable by an adjustment screw 208 threaded through the free end of the clutch arm. Coil spring 210 positioned between the clutch arm and the screw head.

In use, the framing knob is forced into the base of the cabinet and the straight tooth positive clutch 172 is engaged. Simultaneously, the clutch arm is rotated about its pivot in a clockwise direction as viewed in FIG. 8 releasing the driving frictional engagement between the drive gear 194 and the framing gear 186. Rotation of the knob 168 in its depressed position rotates the gear 182 and thence the idler gear 184 which in turn rotates the framing gear 186. The driving member 192 of the dog clutch is carried upon the end of the drive shaft 188 for rotation therewith. Since the dog clutch is engaged with the splined receiver 87 of the film spool 78, the film is advanced. The film is driven between the operative plates 146 and 148 until the desired image is framed.

- FILM DRIVE -

The frame advance means 26 is particularly illustrated in FIG. 6 and is powered by a capacitive start reversible four pole rotor clutch motor 210. The motor includes a spring loaded rotor 212 which, during period of de-energization, is forced to a disengaged off-center position with respect to the armature. Secured to one end of the rotor is a coupling in the form of a cross-pin dog-clutch generally designated by the numeral 214. Extending from end of the rotor and axially off-set is a single pin 216 which engages a cross-pin 218, passing normally through an indexing drive shaft 220. The shaft is journalled through a drive assembly support bracket 222. Secured to the shaft for rotation by the motor is a worm gear 224.

Upon energization, the rotor 212 of the motor 210 is drawn into the field of the armature. The magnetic centering of the rotor causes the cross-pin dog-clutch 214 to engage, thus driving the worm gear 224. Upon de-energization of the motor, the coupling is immediately released and the rotor allowed to coast to a stop in disengagement. This particular arrangement is advantageous in that it allows the rotor 212 to coast to a stop without altering the position of the frame advance means 26. A pinion gear 226 is secured to an idler shaft 228 journaled in the bracket 222. Formed within the gear is the driving member 230 of a geneva drive 232.

The geneva driving member 230 includes a locking circle 234 and a drive pin 236 engaging a geneva star 238 mounted upon an indexing drive shaft 240 journaled through the bracket 222 and through the inner wall 104. The axis of the shaft 240 is normal to the axis of the motor drive shaft 220. The geneva star 238 is a four-pointed star so that each revolution of the drive pin 236 will turn the drive shaft 230 through ninety degrees. Secured to the drive shaft adjacent the inner wall 104 is an indexing shaft gear 242 which is engaged with the drive gear 194. As previously mentioned, during normal operation the coil spring 200 forces the shoulder washer 202 against the drive gear 194 so that the gears 194 and 186 are in frictional engagement. Upon energization of the motor, the geneva drive pin 236 rotates in response to an actuation pluse, to be further described, and the driving member 230 rotates off of its center position illustrated in FIG. 6. A cam 244 formed upon the driving member 230 engages the leaf of a normally closed micro-switch 246. The microswitch holds the motor 210 energized through a complete revolution of the driving member 230. As the geneva 232 completes one incremental operation the cam 244 again opens the micro-switch de-energizing the motor causing the rotor 212 to be immediately released from the armature field. The motor 210 dynamically brakes without causing any additional movement of the geneva or interfering with the framing previously obtained. In this manner, after the initial frame has been positioned in the aperture 122 accurate framing is maintained throughout projection. After projection of the film, the motor 210 is reversed driving the drive means 26 in the reverse direction thereby rewinding the film back into the cartridge.

- REWIND -

To prevent rewind of the film to the point that the film becomes disengaged from the drive spool 78 of the cartridge and to facilitate immediate replay without the need for manual framing, a rewind sensing means 248 is provided. In this regard, the start of the film, which of course corresponds to the end of rewind, is cut with an elongated sprocket hole or rather a series of two or three sprocket holes are connected by cutting the lands between adjacent holes. The sensing apparatus on end of rewind includes feeler 250 which rises upon the margin of the film. The feeler 250 is journaled upon a support shaft 252. The feeler carries a locking tab 254 as well as a micro-switch actuation arm 256. During normal movement of the film through the aperture 122, the feeler 250 rises along the film surface. The feeler 250 is caused to rotate in a clockwise direction, as viewed in FIG. 6, thereby closing the normally open rewind micro-switch 258. During this mode of operation the locking tab 254 engages a locking tab 260 carried by a recorder interlock feeler 262. The recorder interlock feeler 262 is part of the film interlock 28. The feeler 262 is rotatable about the shaft 252 and biased toward the film by a torsion spring 264 (FIG. 1). The lower end of the feeler engages the locking surface 144 of the pawl 122 preventing removal of the drawer. When the film returns to its completely rewound position, the feeler 250, which is biased by the internal switch spring acting through the micro-switch leaf, drops into the elongated sprocket hole, opening the micro-switch 258 and de-actuating the motor, thus preventing further rewind. At this point the interlock feeler 262 is resting on the film emulsion preventing removal of the drawer. In the event it is desired to remove the film, the framing knob 168 is pushed inwardly engaging the straight tooth coupling 172 and the film is rewound into the cartridge. The interlock feeler 262 under the bias of the torsion spring 264 drops into the aperture 22, alowing the pawl 122 to be actuated for release of the drawer 115.

- CONTROL CIRCUITRY -

Figure 9:
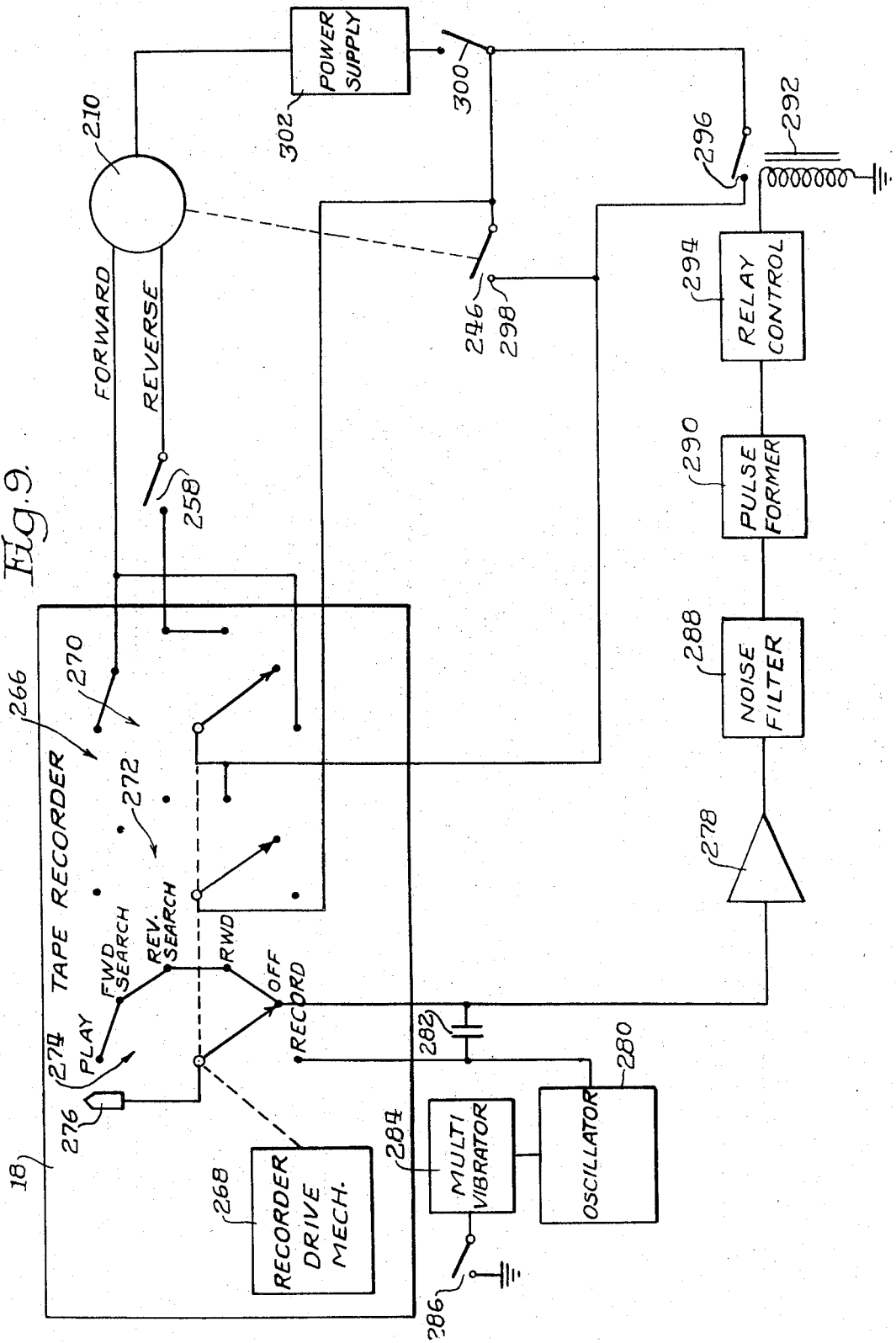
FIG. 9 is a symbolic diagram of the circuitry utilized to control the projector of FIG. 1.

With respect to FIG. 9, the tape recorder 18 is modified to include a three-gang six position rotary switch 266 for purposes of selecting the various modes of operation. The switch shaft is coupled to a recorder drive mechanism 266 of conventional construction and serves to control the speed and direction of the tape transport drive as determined by the position of the selector switch 266. It will be appreciated that the various functions can be alternately selected by means of pushbutton switches interconnected by a locking cam, in a manner well known to those skilled in the art. For purposes of discussion the switch-gangs are designated as a motor gang 270, a rewind gang 272 and a transducer head-gang 274. The tape recorder also includes a conventional pick-up head, an amplifier and a speaker system for playing back the audio accompaniment from the tape's audio track. However, for purposes of clarity, the conventional tape recorder circuitry has not been illustrated and will not be further described.

The wiper of the transducer gang 274 is connected to a control track transistor head 276 for pick-up and play-back of the film advance control signals. The fixed contacts of the transducer gang in the play, forward search, reverse search, rewind and off positions are interconnected directly to the input of an amplifier 278. In the record position, the transducer is connected directly to the output of an oscillator 280 which is coupled by a capacitor 282 to the input of the amplifier 278. The oscillator is triggered by means of a multivibrator 284 which is activated by a switch 286. The multi-vibrator 284 pulses on the oscillator 280 for a fixed period of time causing a pulse to be applied to the amplifier which is recorded upon the control track of the tape. Thus, each time the filmstrip is to be advanced the switch 286 is depressed triggering the vibrator 284 which activates the oscillator 280. The pulse is recorded on the control track of the tape and is applied as a film advance pulse to the amplifier 278. The output of the amplifier is connected to a noise filter 288 which is utilized during playback to eliminate noise transients on the tape from actuating a pulse former 290. The pulse former 290 is coupled to the output of the noise filter 288. The pulse former 290 is preferably a bistable multi-vibrator actuated by the incoming audio pulses thus providing an output pulse of fixed duration independent of the duration of the input signal. The output of the pulse former 290 activates a single pole normally open relay 292 through a relay control 294.

As will be further discussed, the period of the pulse former 290 is such that the motor 210 is actuated for a period of time sufficient to cause the cam surface 244 on the geneva 232 to close the micro-switch 246 so that the locking disc 234 will complete a single revolution before the motor is turned off. A fixed contact 296 of the relay 292 is connected to the wiper of the motor gang 270 as well as to the rewind contact on the rewind gang 272. The fixed contact 296 is also connected to a fixed contact 298 of the motor hold micro-switch 246. The movable contact of the micro-switch 246 as well as the movable contact of the relay are connected to one pole of an on or off power switch 300 as well as to the wiper of the rewind gang 272. The remaining terminal of the on-off power switch is connected to a power supply 302 and the remaining terminal of the power supply to the common motor terminal. The forward lead of the motor is terminated at the record, play and forward search contacts of the motor gang 270 and the reverse lead through the end of rewind micro-switch 258 to the reverse-search and rewind contacts of the motor gang.

- OPERATION -

For purposes of discussion it will be assumed that a selected filmstrip is to be provided with audio accompaniment. The user seats the filmstrip into the film retaining springs 68 of the audio visual cartridge cover 30 and routes the film so that the srocket holes thereof engage the sprocket teeth 86 on the film drive spool 78. The cover is locked by the locking bosses 56 engaging the locking holes 76 in the cover and an erased audio-cassette cartridge is secured in place by means of the retaining spring 38. The access door 135 is opened, the drawer lock knob 128 depressed releasing the locking pawl and the recorder removed from the cabinet. The cartridge 20 is positioned in the recorder and the recorder 18 returned to the cabinet. The rear of the recorder 18 engages the biasing means 136 and the locking pawl 122 drops into the notch 126.

The user pushes the framing knob 168 against the action of the spring biased clutch releasing the drive gear 194 from frictional engagement with the framing gear 186 and simultaneously engaging the straight tooth positive clutch 172. The knob is then rotated until the first frame is positioned in the aperture 22 for projection. The knob is released and the arm forces the clutch 172 out of engagement. The power supply is turned on by the switch 300 and the selector switch 266 placed in the record mode.

The user records the desired audio-accompaniment for the frame being projected, and when it is desired to advance the frame, the switch 286 is depressed actuating the multi-vibrator 284 which activates the oscillator 280 for a fixed period. The output of the oscillator 280 is recorded upon the control track of the tape recorder 18 by means of the head 276 and is also coupled through the capacitor 282 to the pulse former 290 and relay control 294. The relay 292 is closed energizing the motor 210 which rotates in a forward direction. The relay 292 is maintained closed for a duration corresponding to the pulse width from the pulse former 290 which is sufficient to assure closure of the micro-switch 246. The motor 210 continues to rotate the geneva 232 through a 90° movement which is correspondingly transmitted by means of the drive shaft 240 to the film drive spool 78. After a complete revolution, the switch 298 is opened by the cam 244 thus interrupting energization of the motor 210. The spring bias on the rotor 212 of the motor 210 results in the immediate disengagement of the coupling 214 allowing the motor to dynamically brake without altering the position of the film. This procedure is repeated until the entire filmstrip has been provided with suitable audio accompaniment.

Upon completion of the recording, the user rotates the switch 266 to the rewind position. In the rewind position, the rewind gang 272 connects one output terminal of the power supply to the wiper of the motor gang which in turn causes the motor to operate in the reverse direction in a continuous manner until the end of rewind micro-switch 258 is opened by the rewind feeler 250 dropping into the elongated sprocket hole previously described. Upon completion of the rewind feature the film is in its start position and the tape recorder is allowed to come to rest.

Normal forward play is obtained by placing the selector switch 266 in play position wherein the control track transducer 276 is connected directly to the amplifier 278. Upon the occasion of advance signal, the relay 292 is momentarily closed energizing the motor 210 in the forward direction. The motor is held in energization for a complete revolution of the geneva locking disc 234 by the motor hold switch 246. When the next successive frame reaches the projection aperture 122, the micro-switch 246 is opened de-energizing the motor.

The positioning of the selector switch 266 in the forward search position actuates the recorder drive mechanism 286 through the mechanical coupling to a fast forward drive mode. In this position the audio is garbled. However, the film advance pulses are fed to the motor 210 and the filmstrip advanced in a rapid sequential fashion. When the operator sees the desired frame upon the screen, he quickly places the control switch in the play posi-tion and the projector continues its normal forward synchronized mode of operation.

In the reverse search position of the switch 266, the recorder drive mechanism 268 is switched to a fast reverse mode. The tape recorder then operates in a reverse direction and at each pulse the film drive motor is rotated in a reverse direction causing the film to back-frame. When the user sees the desired frame, he then quickly interrupts the reverse search by placing the switch 266 in the play position or off position. The projector is then ready for forward play.

While this invention has been particularly shown and described with reference to a preferred embodiment thereof it will be understood by those skilled in the art that various changes in form and detail may be made without departing from the spirit and scope of the invention.

We claim:

1. In combination with a filmstrip projector including a light source, a power source, a motor driving a filmstrip and means for projecting an image provided by the filmstrip at a projection screen the improvement comprising:

a recorder having a control track providing a control signal for the actuation of said motor;

means for starting said motor in response to said control signal;

switch means coupled to said motor for maintaining said motor operational through a predetermined movement corresponding to the advance of one film frame; and an oscillator coupled to the recording head and to said starting means for recording a control signal in the audio track of the recorder and simultaneously advancing said film.

2. The apparatus of claim 1 which further includes a multi-vibrator connected to said oscillator for control thereof so that upon activation of said multi-vibrator said oscillator will be turned on for a predetermined time period.

3. In combination with a filmstrip projector including a light source, a power source, a motor driving a filmstrip and means for projecting an image provided by the filmstrip at a projection screen the improvement comprising:

a recorder having a control track providing a control signal for the actuation of said motor;

a first switch means for actuating said motor in response to said control signal wherein said motor is initially actuated through a movement less than a predetermined movement; and a second switch means coupled to said motor and responsive to said initial actuation of said motor for maintaining said motor operational and enabling the continuing actuation of said motor through said predetermined movement.

4. The apparatus of claim 3 wherein said first switch means comprises:

a relay coil energizable in response to said control signal; and a first normally open switch wherein said first switch is closed only when said relay coil is energized and wherein said motor is actuated when said first switch is closed.

5. The apparatus of claim 4 wherein said second switch means comprises:

a second normally open switch connected in parallel with said first switch; and a cam means coupled to said motor for closing said second switch and for maintaining said second switch closed for a predetermined time.

6. The apparatus of claim 3 wherein said starting means includes a noise filter for removing spurious responses produced by said transducer head during playback.

7. The apparatus of claim 6 wherein said starting means includes a pulse former receiving said control signals and providing an output pulse in response thereto having a predetermined shape.

* * * * *